United States Patent
Javidi et al.

(10) Patent No.: US 7,068,844 B1
(45) Date of Patent: Jun. 27, 2006

(54) METHOD AND SYSTEM FOR IMAGE PROCESSING FOR AUTOMATIC ROAD SIGN RECOGNITION

(75) Inventors: Bahram Javidi, Storrs, CT (US); Elisabet Perez, Barcelona (ES)

(73) Assignee: The University of Connecticut, Storrs, CT (US)

( * ) Notice: Subject to any disclaimer, the term of this patent is extended or adjusted under 35 U.S.C. 154(b) by 610 days.

(21) Appl. No.: 10/004,401

(22) Filed: Nov. 15, 2001

(51) Int. Cl.
*G06K 9/68* (2006.01)

(52) U.S. Cl. ...................... 382/218; 382/209

(58) Field of Classification Search ........ 382/103–104, 382/181, 209, 218, 260, 280, 30, 305
See application file for complete search history.

(56) References Cited

U.S. PATENT DOCUMENTS

| | | | | |
|---|---|---|---|---|
| 5,303,313 A | * | 4/1994 | Mark et al. ................. | 382/235 |
| 5,644,655 A | * | 7/1997 | Windsor .................... | 382/209 |
| 5,963,148 A | * | 10/1999 | Sekine et al. .............. | 340/905 |
| 6,002,807 A | * | 12/1999 | Guerci ....................... | 382/278 |
| 6,067,374 A | * | 5/2000 | Fan et al. ................... | 382/135 |
| 6,453,056 B1 | * | 9/2002 | Laumeyer et al. .......... | 382/104 |
| 6,801,638 B1 | * | 10/2004 | Janssen et al. ............. | 382/104 |

OTHER PUBLICATIONS

Escalera, et al. "Road traffic sign detection and classification", IEEE, pp. 848-859, 1997.*
Perez, et al. "Scale and illumination-invariant road sign detection", IEEE, pp. 748749, 2000.*
Franke, et al. "Autonomous driving goes downtown", IEEE, pp. 40-48, 1998.*
Huang, et al. "Road sign interpretation using matching pursuit method", IEEE, pp. 329-333, Sep. 2000.*
Estevez, et al. "A real-time histographic approach to road sign recognition", IEEE, pp. 95-100, 1996.*

* cited by examiner

*Primary Examiner*—Daniel Miriam
(74) *Attorney, Agent, or Firm*—Cantor Colburn LLP

(57) ABSTRACT

The invention may comprise is a method and system of processing an image such as a road sign wherein the image is viewed from a host such as an automobile. The method begins with the initiating of a scan of an object to obtain an input. The input is converted to a signal before comparing the input with a set of stored inputs to determine a match. The converting step occurs via a fourier or similar transform to produce a transformed input; and, then filters the transformed input using nonlinear filtering.

23 Claims, 11 Drawing Sheets

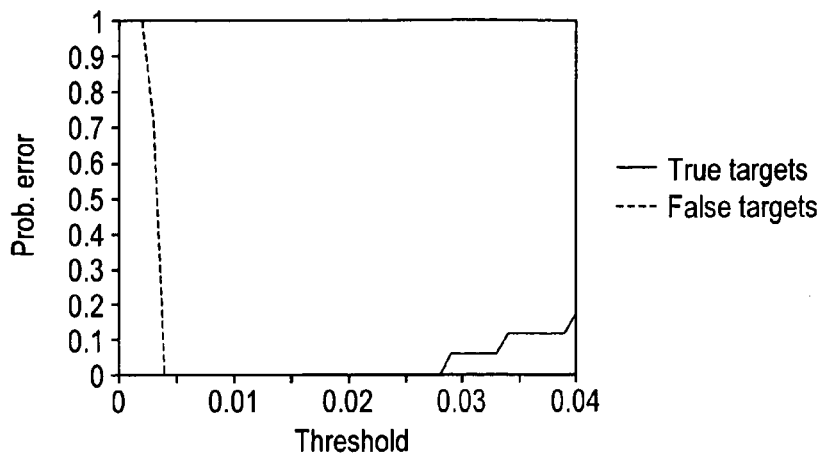
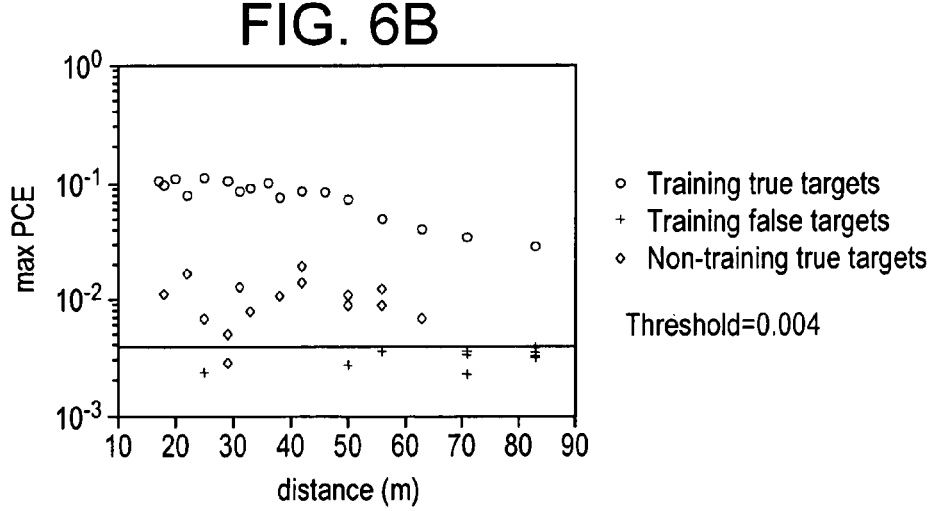
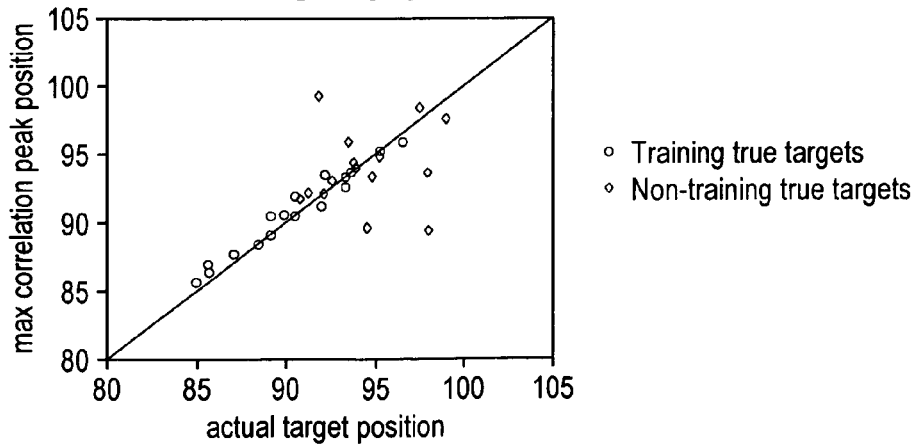

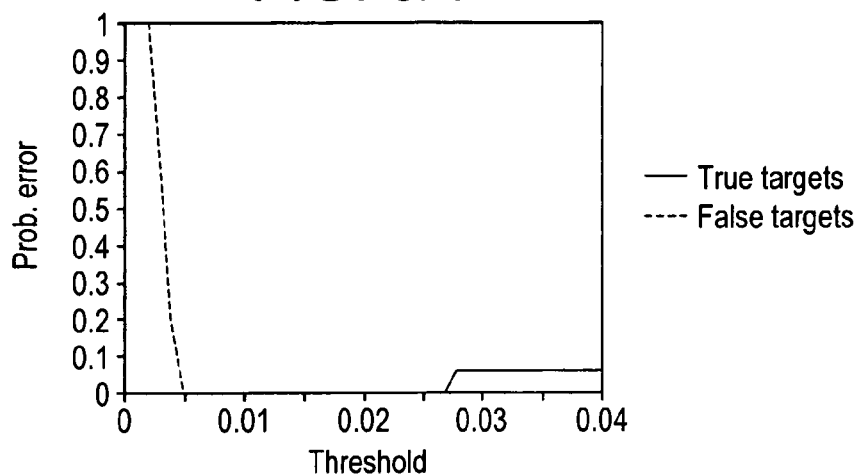
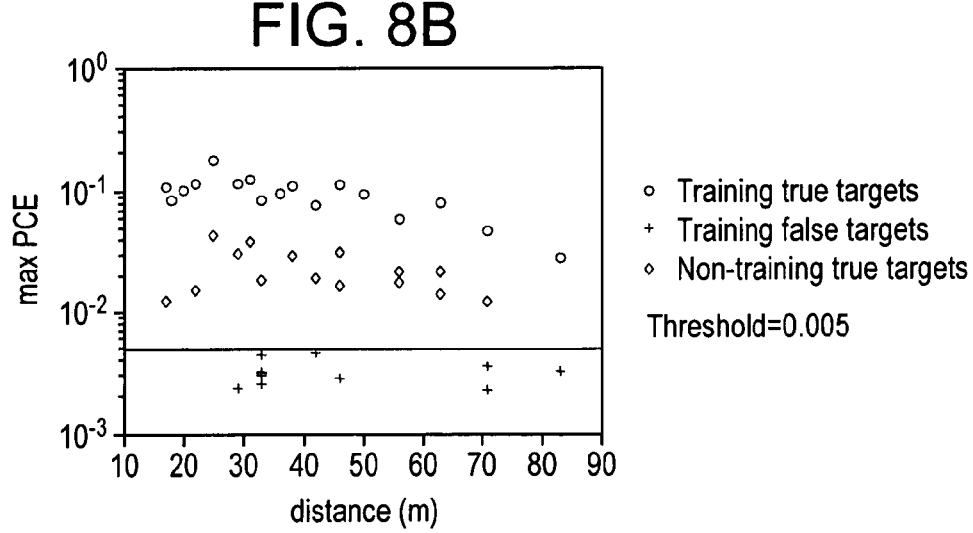
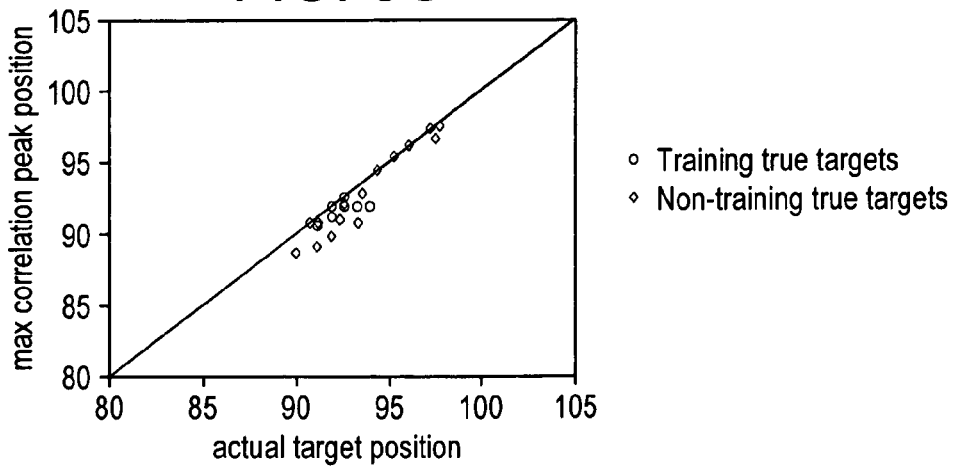

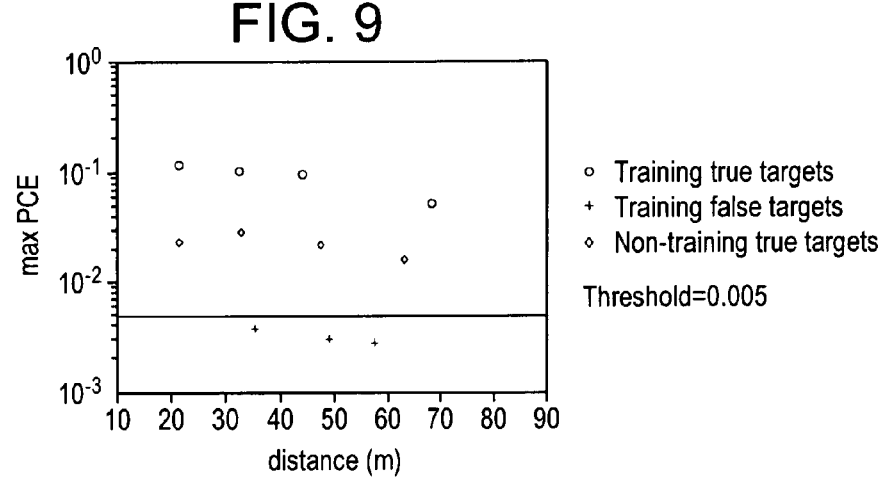

METHOD AND SYSTEM FOR IMAGE PROCESSING FOR AUTOMATIC ROAD SIGN RECOGNITION

FIELD OF THE INVENTION

The invention is within the broad field of pattern recognition and more specifically within the field of devices that can be utilized to identify an image based upon full or partial scanning of the image and then comparison of that image to a predetermined or stored set of images.

BACKGROUND OF THE INVENTION

The ability of a machine or computer to recognize an object has broad applications. These range from machine inspection or adaptive manufacturing processes to actually driving a vehicle without human intervention. The proposed invention utilizes unique approaches to recognition of road signs for a variety of purposes, including but not limited to the safety of the driver and other drivers, assistance seeing and recognizing road signs in obstructed conditions like fog or darkness, or assistance for visually impaired drivers.

The technical challenges of machine vision are known. Most systems use a sensor input such as a still image or video camera and then digitize or quantize the image into a set of numbers or vectors which may be easily manipulated and compared with other numerical representations or vector sets using a processor. The mathematical representation of the object to be recognized may be referred to as a mask when expressed using the same mathematical process as the video or photographic image. The two representations, image and mask, may be compared mathematically.

Numerical correlation will occur as a result of processing the image data against the mask data whenever the image resembles the mask. A threshold is established for this measure of correlation such that correlation above this threshold level may be considered a match with the mask or target object. A variety of mathematical techniques may be used to determine correlation. The method for rendering a correlation result and the determination of the best threshold to define a match help to determine the accuracy or effectiveness of the vision recognition system.

Optical process is also possible, rather than pure digitized image signal processing. In this case optical transforms may be used and optically compared with optical masks that have been optically processed in a similar manner. Control of coherence, splitting and remixing of the illuminating light through the optical system make this feasible within the optical domain alone and without the use of computers or digitized image data.

These recognition techniques need not use visible light to facilitate object or mask recognition. For example, radar systems use non-visible electromagnetic radiation to illuminate and "see" a target. The radar sensor data may be compared with known mask data to identify targets. Ultrasonic and sonar imaging are equally analogous, with th basic concepts being similar.

The application that uses known road signs as targets for comparison in the vision system has significant benefits to drivers. For example, aging drivers may be able to supplement their own skill using such a system and drive safely for a longer period of their lives. When visibility is limited, or when signs are partially obscured, these vision recognition systems will likely to a better job of seeing and recognizing road signs that human drivers. Missed or misunderstood road signs are a significant cause of collisions worldwide.

The challenge in using a non-human system to recognize road signs, and then initiate planned events such as alarms, audio reading of the sign, or other actions, is being sure that the applicable sign is read and that the sign is read accurately. In this sense, it is important that the levels of correlation be adjusted to the right degree of recognition. This reduces false positive reads and also reduces missed signs, even when the input signal is minimal due to visibility or partial obstruction. Therefore, one aspect of the present invention is the provision of a non-human system that capable of complementing the system user while providing meaning correlation thresholds to determine accurate road sign readings.

SUMMARY OF THE INVENTION

The invention is a method and system of processing an image such as a road sign or an animal wherein the image is viewed from a host such as a car or a truck.

The method comprises a number of steps that begin with the initiating of a scan of an object within a broader field of vision by a scanner so as to obtain an input. The input would preferably be that of a road sign or of an animal crossing the host's path. The input is further capable of being converted to a signal representative of the input before comparing the input with each one of a set of stored inputs to determine a match between the scanned input and the set of stored inputs. The converting step further comprises converting the input via a fourier transform of the input to produce a transformed input; and, then filtering the transformed input using nonlinear filtering. The stored inputs are predetermined by scanning one or more reference images. Each one of the stored inputs is produced by converting a predetermined input via a fourier transform to produce a stored input; and, then filtering the stored input using nonlinear filtering. Thus, as an input is scanned by the host-mounted scanner, the image is converted to a signal and that signal compared to the stored set of signals representative of the series of reference images. If a match is determined, the system will read a set of instructions associated with the stored reference image. However, if a match is not determined, then the scanner will continue to scan the broader field of the road or other surface for a second or subsequent image to be subjected to the comparison step.

The stored inputs are predetermined by scanning one or more reference images such as a series of particular road signs or a series of particular images of animals such as deer or people. Each one of the stored inputs are produced according to a method comprising the steps of converting a predetermined input via a fourier transform of the predetermined input to produce a stored input; and, then filtering the stored input using nonlinear filtering. As an input is scanned by the host-mounted scanner, the image is converted to a signal and that signal compared to the stored set of signals representative of the series of reference images. If a match is determined, the system will read a set of instructions associated with the stored reference image. However, if a match is not determined, then the scanner will continue to scan the broader field of the road or other surface for a second or subsequent image to be subjected to the comparison step.

The system itself comprises means for scanning the target image and returning the image to the system for conversion to a signal indicative of a data set. The system further comprises conversion means, such as scanner software or software separately maintained outside the scanner, for converting the scanned image to a set of data for comparison with one or more stored sets of data representative of one or more expected images (stored reference images). The reference images are stored in a memory of the system which can be located within a system housing or within the host itself. In addition to the stored reference images, a set of one or more instructions can be stored with each image wherein the set of instructions is indicative of an action to be performed by the host if a match is determined between the scanned image and a stored reference image.

A system microprocessor is utilized to assist the comparison means for comparing the set of scanned data to each one of the stored sets of one or more images. The comparison means can be a software program designed to weight the data of the scanned image with the data representative of the stored reference images. As the comparison is being performed by the system, determination means are utilized for determining whether or not the set of scanned data matches one of the stored sets of data. If a match is found, then transmission means, which can be hardwired or wireless based, for transmitting a signal from the system to the host, can be activated by the system to cause the host to react in accordance with the set of instructions (eg. Upon determining that a scanned image is a stop sign, the system can cause an audible or visual alarm to sound so that the driver is made aware of the approaching stop sign).

BRIEF DESCRIPTION OF THE DRAWINGS

FIG. 6A is a graph of the set of recognition results for non-linear ECP SDF filters tolerant to in-plane rotations wherein the probability of error in the classification of training images is shown.

FIG. 6B is a graph of the set of recognition results for non-linear ECP SDF filters tolerant to in-plane rotations wherein classification of true targets and false targets with respect to the established threshold value is shown.

FIG. 6C is a graph of the set of recognition results for non-linear ECP SDF filters tolerant to in-plane rotations wherein correlation of peak position versus an actual target position is shown.

FIG. 8A is a graph of the recognition results for non-linear ECP SDF filters tolerant to out-of-plane rotations wherein the probability of error in the classification of training images is shown.

FIG. 8B is a graph of the recognition results for non-linear ECP SDF filters tolerant to out-of-plane rotations wherein the classification of true targets and false targets with respect to the established threshold value is shown.

FIG. 8C is a graph of the recognition results for non-linear ECP SDF filters tolerant to out-of-plane rotations wherein the correlation peak position versus the actual target position in the scene is shown.

FIG. 9 is a graph of the recognition results achieved by post processing of the correlation outputs of FIG. 8B.

DETAILED DESCRIPTION OF THE PREFERRED EMBODIMENTS

Figure 1:
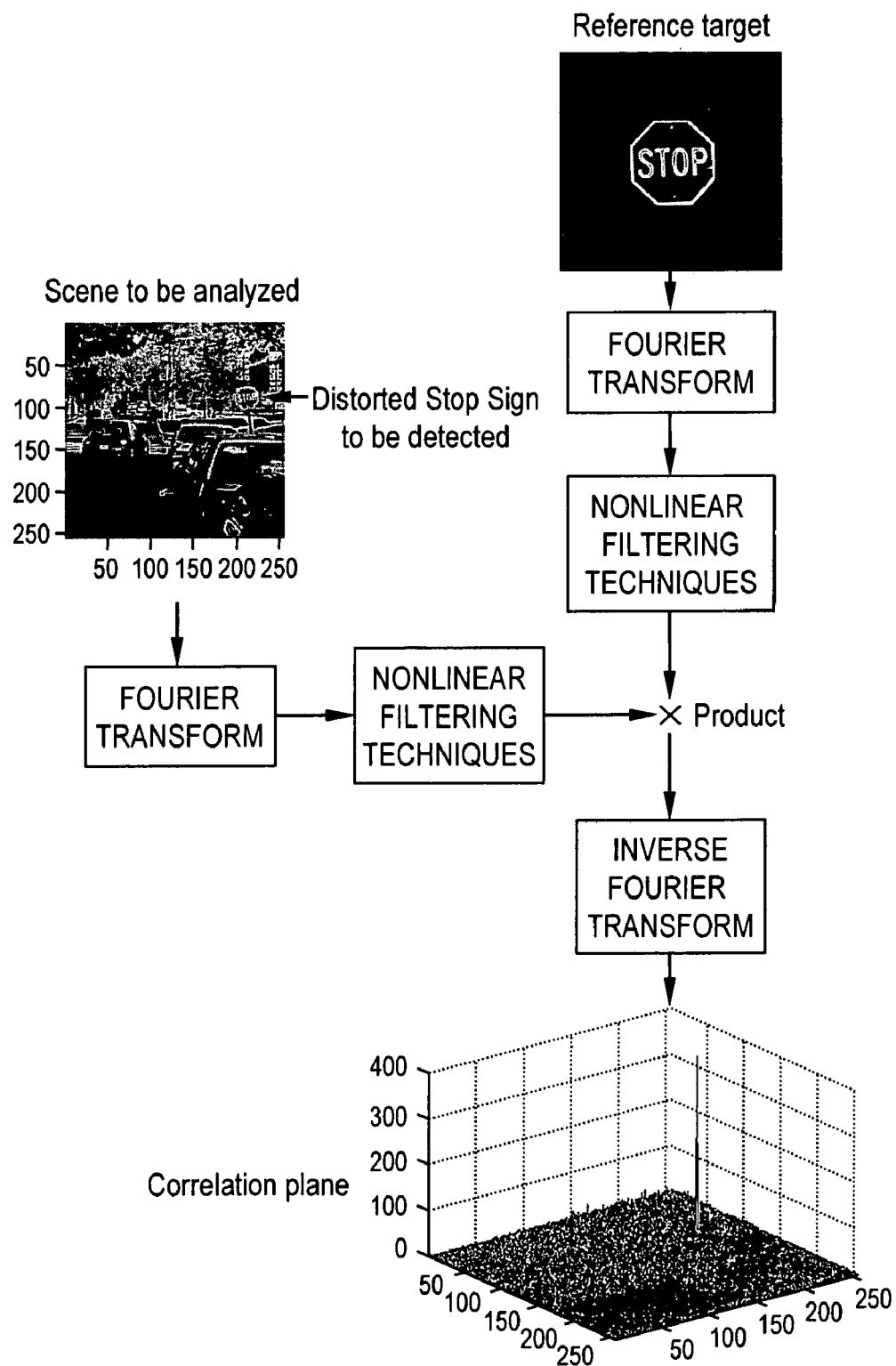
FIG. 1 is a diagram of a non-linear processor that is capable of embodying the present invention.

Design of an on-board processor which enables recognition of a given road sign from a vehicle in motion is disclosed herein. A safety system to be installed in vehicles is based on this processor in order to automatically detect and identify road signs. Afterwards, the recognition system could make an objective decision according to the information detected. One of the greatest difficulties on achieving this goal lies on the number of different distortions that may simultaneously modify the reference sign. Variations in scale, in-plane and out-of-plane rotations, background clutter, partially occluded signs, variable illumination, are some examples of distortions that can affect road signs. To overcome these problems, a number of techniques have been studied in pattern recognition. Some of them have been applied to road sign recognition. For instance, an optical correlator for scale-invariant road sign detection has been proposed in the prior art. Recently, partial tolerance to in-plane rotations and scale-invariance have been obtained by using partially invariant filters in a multiple correlator.

In general, a given recognition technique is designed to provide satisfactory results when dealing with a particular distortion of the object. However, the same strategy usually gives poorer results if another type of distortion affects the object. Analysis and comparison of different techniques are disclosed herein. A recognition system simultaneously scale-invariant and tolerant to slight tilts or out-of-plane rotations due to different view angles of the acquisition system is obtained by combining various strategies. Tolerance to illumination fluctuations is needed in order to enable a recognition system to work under different illumination or weather conditions. Robustness to cluttered background is also important for a road sign recognition processor which analyzes images captured in real environments.

The proposed distortion-tolerant processor is based on a nonlinear correlator [15], which is described in detail in section 2. Some principles of pattern recognition based on digital image processing are introduced in the same section. Section 3 concentrates on some filtering techniques applied to distortion-tolerant systems. In section 4, the influence on the recognition system of a variety of distortions, such as scale variations, in-plane and out-of-plane rotations is studied. Section 5 considers post-processing of the correlation results to improve road sign recognition results. Section 6 presents the application of the proposed distortion-tolerant recognition system to images with real cluttered background and which include road signs affected by several of the aforementioned distortions. A summary is presented in section 7 to conclude the work.

2. Pattern Recognition by Image Processing 2.1 Linear and Nonlinear Correlators

A measure of similarity between two objects can be computed by the correlation operator. The mathematical expression of correlation between two functions, $s(x,y)$ and $r(x,y)$, is defined by $$c(x, y) = s(x,y) \otimes r(x,y) = \int_{-\infty}^{\infty}\int_{-\infty}^{\infty} s(\xi, \eta) r^*(\xi - x, \eta - y) d\xi d\eta, \quad (1)$$

where * denotes complex-conjugate and correlation. If functions $s(x,y)$ and $r(x,y)$ describe a scene to be analyzed and a reference target, respectively, correlation between them is a measure of the overlapping of objects contained in the scene and the reference. In that sense, correlation could be considered as an estimation of their degree of similarity. Correlation can be also expressed in terms of Fourier transforms. If the hat symbol ^ is used to denote the Fourier transform of a function, the correlation operation expressed in eq. (1) can be defined in a equivalent way by [16,17]

$$c(x,y) = TF^{-1}\{\hat{s}(x,y)\hat{r}^*(x,y)\} \quad (2)$$

where $TF^I$ stands for the inverse Fourier transform.

Eq. (2) shows that correlation between two functions can be obtained by multiplying their Fourier transforms in the frequency domain and by inverse Fourier transforming this product. Since Fourier transforms and product operations can be achieved optically, correlation between two functions can also be implemented optically. Systems that perform correlation are named correlators and they permit real-time processing of a large amount of information using optics. The combination of advantages given by optics along with some properties provided by electronics has make feasible the implementation of powerful hybrid opto-electronic processors for solving different pattern recognition tasks.

Linear correlators described by eq. (1) have many limitations for recognizing objects in background noise. In addition, these correlators are not tolerant to image distortions such as scale, rotation and illumination fluctuations. Applying different spatial filtering techniques prior to multiplying the Fourier transforms in the frequency domain permits to overcome these problems. For instance, it is possible to recognize an object that presents some distortions such as scale variations or rotations, or even to detect an object when the signal is degraded by noise.

When Fourier transforms of the scene and the reference target are modified by a nonlinear operator, the processor is considered to be a nonlinear correlator. Turning now to FIG. 1, there is shown a diagram of a non-linear processor that is capable of embodying the present invention. Nonlinear filtering is being used in the correlator due to its superior performance in comparison with linear filtering techniques in terms of discrimination capability, correlation peak sharpness, and noise robustness. In a k'th-law processor, the nonlinear operator applied symmetrically to the scene and to the reference Fourier transforms is defined by $$g(f) = sgn(f)|f|^k \exp[i\phi_f] k \leq 1. \quad (3)$$

Parameter k controls the strength of the applied nonlinearity. For k=1 a linear filtering technique is obtained, whereas k=0 leads to a binarizing nonlinearity. Intermediate values of k permit to vary the features of the processor, such as its discrimination capability or its illumination-invariance. Precise index k needs to be determined to obtain a good performance of the processor depending on the application.

There exist many different metrics to evaluate correlation filter performance. Some of them are described in summarizing works elsewhere. To evaluate correlation results in the base experiments a criterion based on the peak-to-correlation energy (PCE) parameter was used, which is defined $$PCE = \frac{|c(0, 0)|^2}{\int\int |c(x, y)|^2 dx dy}. \quad (4)$$

This parameter measures the ratio between the intensity value of the output peak at the target location ($|c(0,0)|^2$) and the total energy of the output plane ($\int\int |c(x,y)|^2$ dx dy). In general, a high and sharp correlation peak is expected when there is an object in the scene that matches the reference target, thus leading to a high value for the PCE parameter. A better match between an object of the scene and the reference, a closer value to unity for the PCE parameter will be reached. For this reason, PCE parameter is a reliable criterion to base the final recognition decision.

A thresholding operation permits to accept a true target or to reject a false object. The threshold level is sometimes established arbitrarily. However, it can be also determined by means of a learning algorithm. A set of training images, containing true targets and false objects permits to measure the probability of error in the recognition process depending on the threshold value. A final threshold level for the recognition procedure is established by considering a null probability of error in the identification of the training objects. In our case, based on the PCE criterion, objects where obtain PCE values above the threshold are considered as true targets. On the contrary, PCE values below the threshold imply the rejection of the object in the recognition process.

Another assumption can be taken into account. Sometimes objects contained in the analyzed scene are compared, simultaneously or sequentially, to different reference targets. In such a situation, different correlation planes are computed for each scene. The final recognition result for the analyzed scene can be processed in different ways depending on arithmetic or logical operations applied to the correlation outputs. In the present invention, a winner-take-all model is used. The PCE parameter is computed for all the output planes and the output plane with the maximum PCE value is selected as the final response of the system. Only if the maximum PCE value is above the threshold, established in the learning process, an object contained in the scene will be recognized as similar to the target.

Different approaches to obtain distortion-tolerant recognition systems exist. They have in common the need of storing information of the reference target taking into account different distortions that can affect it.

The most straightforward way to keep the information of the distorted versions of a target is to design a single filter for each type of distortion to be considered. In the present disclosure, a filter bank is disclosed. To determine if a target, distorted or not, is included in a given scene, it is necessary to correlate the scene with the multiple filters belonging to the bank. This technique could be time-consuming. To avoid large computing time, composite filters are introduced.

In a general approach, the information included in a composite filter consists of various views of the target under different situations (different rotation angles, scale variations, changes in illumination, etc.). The synthesis of all the information in a unique composite filter is carried out by taking into account different constraints. The constraint operation used in the synthesis of a composite filter provides desirable features for the correlation output such as sharp correlations peaks, noise robustness, low output-noise floor, etc.

The principal advantage of a composite filter in front of a bank of filters is the reduction of time in the processing step. Only a single correlation can be enough to compare a given image with the whole set of distorted versions of the sought reference. However, composite filters can sometimes disrupt noise robustness and discrimination capability. The number of images (distorted versions) of the reference included in a composite filter should be limited in order to obtain a successful recognition performance.

In this work, Fourier-plane nonlinear filters are used as composite nonlinear filters. They are modifications of other well-known distortion-invariant filters. It has been shown that Fourier-plane nonlinear filters have tolerance to in-plane and out-of-plane rotations, as well as good performance in the presence of different types of noise. The k th-law equal-correlation-peak synthetic discriminant function (ECP SDF) is tested in the below identified simulation experiments to design a distortion-tolerant road sign recognition system.

2.2 k th-Low Equal-Correlation-Peak Synthetic Discriminant Function (ECP SDF).

Let $s_1(x,y)$, $s_2(x,y)$, ... $s_N(x,y)$ represent N training images. Let P be the total number of pixels contained in each image. Instead of a matrix to represent an image, we use a vector notation by means of lexicographic ordering. A P-element column vector is obtained for each image by rearranging the rows of the matrix. This operation is performed from left to right and from top to bottom. We construct a training data image S that has the vector $s_i$ as its i'th column. Therefore, S is a P×N matrix. The lexicographical ordered composite filter h(x,y), that is the equal-correlation-peak synthetic-discriminant-function, can be expressed as [1]

$$h = S(S^+S)^- c^*, \qquad (5)$$

where $S^+$ is the complex-conjugate transpose of S, and $(\ )^{-1}$ denotes the inverse matrix. Vector c contains the desired cross-correlation peak value for each training image, and c* is the complex conjugate of c. Eq. (5) can be rewritten in the frequency domain as $$\hat{h} = \hat{S}(\hat{S}^+\hat{S})c^*, \qquad (6)$$

where the hat symbol ^ denotes Fourier transform. The k'th-law nonlinear composite filter is obtained by replacing $\hat{S}$ in eq. (6) by $\hat{S}^k$ where nonlinearity is applied on each element of the matrix. The nonlinear operator, for the element of r'th row and l'th column of $S^k$, is defined to be $$|S_{rl}|^k \exp(j\phi_{s_{rl}}), \qquad (7)$$

and the corresponding k'th-law ECP SDF filter is [8,9]

$$\hat{h}^k = \hat{S}^k[(\hat{S}^k)^+\hat{S}^k]^{-1}c^*. \qquad (8)$$

Tolerance of the proposed recognition system to scale variations, in-plane and out-of-plane rotations of the objects is an element of the present invention. Description of the procedure that allows system invariance to scale modifications of the object is further disclosed.

Figure 2A:
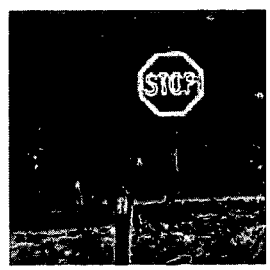
FIG. 2A is a sample of an image considered as a training target.
Figure 2B:
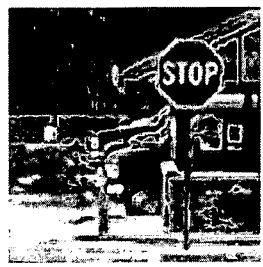
FIG. 2B is a sample of an image considered as a non-training target.
Figure 2C:
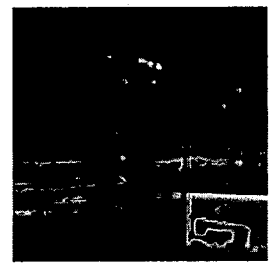
FIG. 2C is a sample of an image considered as a false object.

There are some common steps in the analysis of the aforementioned distortions. Several images have been captured in a real environment. As can be seen in FIG. 2A, there is shown a sample of an image considered as a training target. In FIG. 2B there is shown a sample of an image considered as a non-training target. And, in FIG. 2C there is shown a sample of an image considered as a false object.

Figure 3:
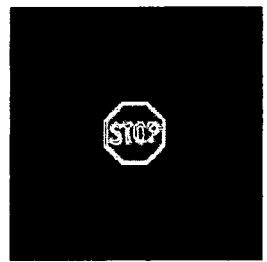
FIG. 3 is an example of a reference target.

A stop sign is being used as a true target to be detected. Pictures containing a stop sign have been divided into two groups: the set of true targets images that train the recognition system, and a different set of non-training stop signs for testing the system's performance. Another set of images containing a different road sign (false object) is used to train the system and to test its discrimination capability. Nonlinear filtering for image processing is carried out by centering the training true targets on a zero background. FIG. 3, on the other hand, displays an example of a reference target used to build nonlinear filters.

Figure 4:
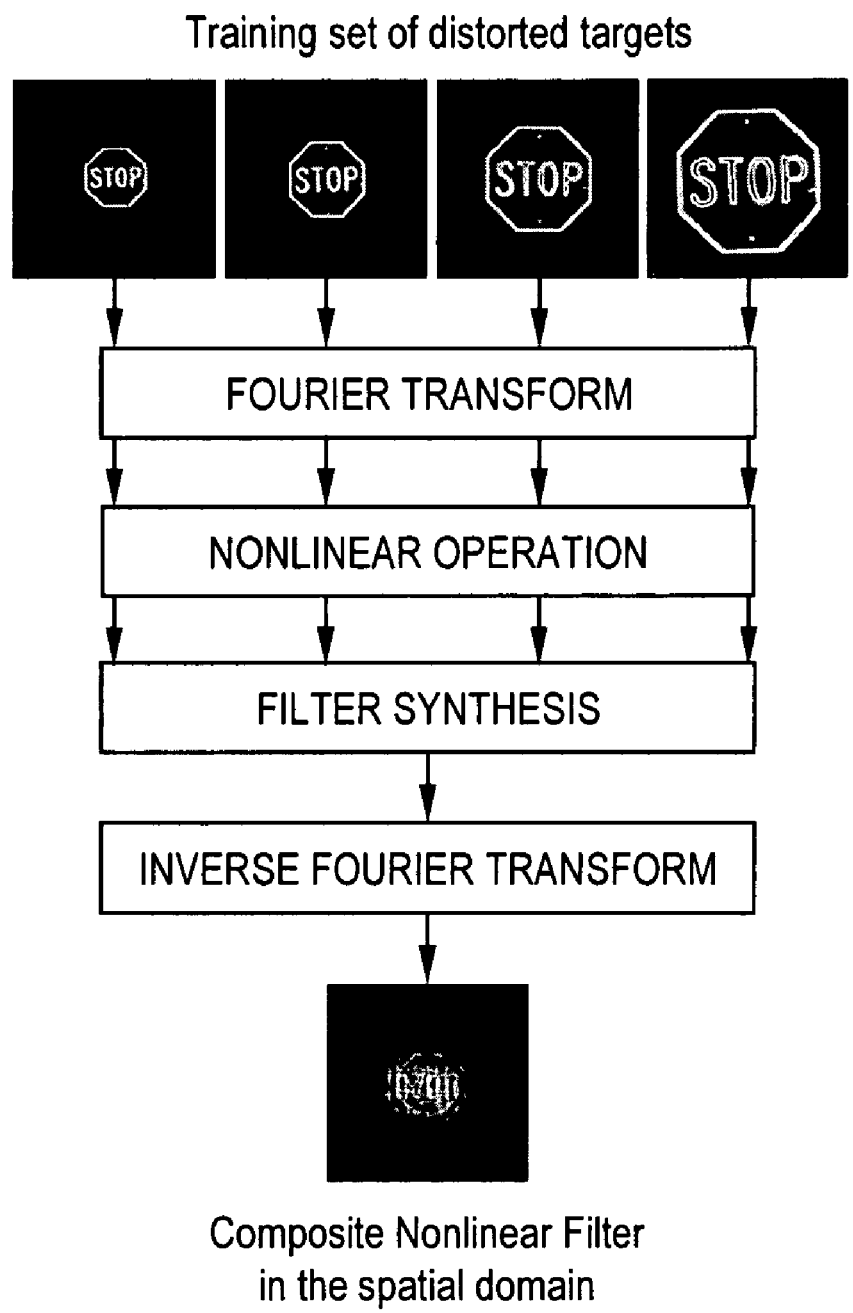
FIG. 4 is a diagram of the synthesis of a non-linear composite filter.
Figure 5A:
FIGS. 5A through 5F are a sequence of extracted video images showing a target relative to the vehicle approaching that target.
Figure 5B:
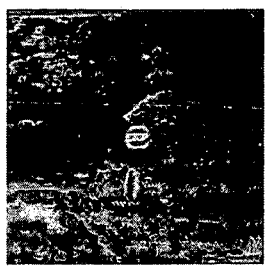
Figure 5C:
Figure 5D:
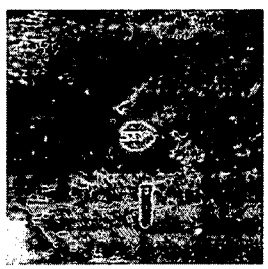
Figure 5E:
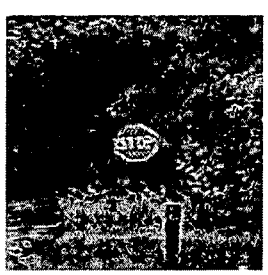
Figure 5F:
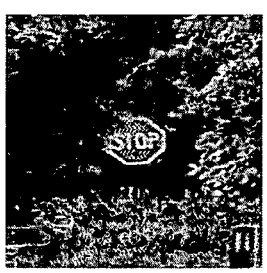
Figure 5G:
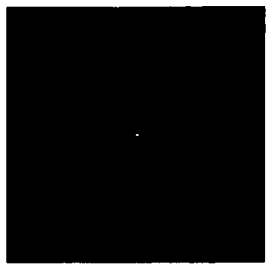
FIGS. 5G through 5L are the correlation outputs corresponding to the sequence of target images of FIGS. 5A through 5F.
Figure 5H:
Figure 5I:
Figure 5J:
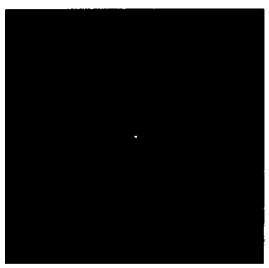
Figure 5K:
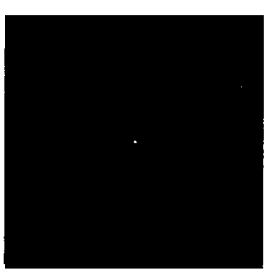
Figure 5L:
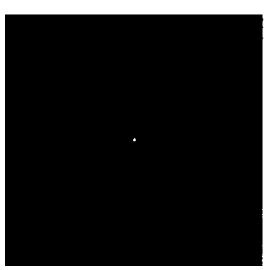

Each image is 128×128 pixels. They are normalized to have a maximum gray scale of unity and then zero padded to 256×256 pixels. The normalized images are Fourier transformed and k'th-law nonlinearity is applied to them. The nonlinear correlation output is obtained by taking the inverse Fourier transform of the product between the nonlinearly modified spectra of both the input signal and the reference target. As a reference target we will consider either a single sign (FIG. 3) to synthesize a nonlinear single filter, or multiple views of a sign to synthesize a composite nonlinear filter. A nonlinear single filter is obtained by applying the nonlinear operator of eq. (3) to the Fourier transform of the reference (stop sign shown in FIG. 3). FIG. 4 describes the operations carried out to synthesize a composite nonlinear filter. The composite nonlinear filter displayed in this figure is obtained by applying eq. (8) with k=0.1 to 6 views of the target varying in scale.

Our previous analysis has shown that nonlinearity of k=0.1 improves correlation results in terms of peak sharpness, discrimination capability and partial illumination-invariance of the system. The results are in accordance with other results obtained for tolerance to target rotations. Thus, value of k=0.1 is selected for all the simulations.

Scale-invariance is required in a road sign recognition system to achieve detection of signs even if the acquisition system is in motion. The wider range of tolerance to variations in scale, the better capability for the recognition system to detect objects located at far distances. A nonlinear processor based on a bank of nonlinear single filters makes feasible the detection of road signs varying in scale. Performance of a nonlinear filter bank was compared to two types of composite nonlinear filters, the k th-law ECP SDF and the k th-law minimum average correlation energy (MACE) filters. Requirements of discrimination capability in a scale-invariant system were not satisfied by composite nonlinear filters. However, results obtained by the bank of nonlinear single filters were successful.

Images of a stop sign changing in size with a variable scale increment were used to build the bank of nonlinear single filters. A non-uniform scale increment of the signs is equivalent to consider frames from a captured video sequence at equal time intervals, provided that the vehicle has constant speed. That is, number of filters is larger for road signs located at far distances than for signs located at closer distances. Varying the increment of scale in the set of single filters improves the system's tolerance to scale-distortion, especially for low-resolution objects.

As an example of the proposed recognition system's capabilities, there are shown results from the analysis of a video sequence. The reference target is a stop sign. The registered video sequence contains also a stop sign in a noisy and real background. In some frames, the sought sign appears distorted by drops of water due to the rain. In this video sequence, captured stop signs were at far distances from the acquisition system, so that they have low-spatial resolution.

FIGS. 5A through 5F are a sequence of extracted video images showing a target relative to the vehicle approaching that target. This set of images contains the stop sign varying in scale as it is approaching to the on-board camera. The proposed nonlinear processor using a bank of nonlinear single filters is applied to each scene. FIGS. 5G through 5L are the correlation outputs corresponding to the sequence of target images of FIGS. 5A through 5F. In all the cases, the stop sign is correctly identified by a sharp and high correlation peak located at the same position of the sign in the scene.

The system's performance with respect to in-plane rotation of the objects is of importance. Two different methods can provide a recognition system with tolerance to in-plane rotations: synthesis of nonlinear composite filters by using in-plane rotated versions of the reference, or rotation of the input signal followed by its correlation with non-rotated versions of the target. In both cases, a digital algorithm to obtain rotated versions of the images is considered.

First, each training stop sign centered in a zero background is digitally rotated in increments of 3 degrees from −9 to 9 degrees around its vertical position. Rotated versions of the training sign are used to construct a nonlinear composite filter by applying eq. 8 with k=0.1. A composite filter is synthesized for each training stop sign captured at a different distance from the camera in order to maintain a scale-invariant system.

In the learning process, recognition results are obtained for the entire training set, which is composed from true targets and false targets. The maximum PCE value is considered to classify signs as similar to the reference or to discriminate them from the sought sign. PCE output values above the threshold correspond to objects considered as similar to the true target, whereas PCE values below the threshold imply the rejection of the object in the recognition process.

In FIG. 6A a graph of the set of recognition results for non-linear ECP SDF filters tolerant to in-plane rotations wherein the probability of error in the classification of training images is shown. A nonlinear ECP SDF filter is used. Solid line in the graph indicates probability of error in the detection of true target and a dashed line plots the probability of error in the rejection of false targets, depending on the threshold value. A minimum threshold value can be established when the probability of misclassification of false targets reaches the value of zero.

The performance of the recognition system by using a set of non-training stop signs captured with an in-plane rotation angle of 4 degrees was performed. Results for nonlinear ECP SDF filters are summarized in FIG. 6B. In this graph, the maximum peak-to-correlation energy (PCE) value achieved among the different output planes is plotted for all the images. A horizontal solid line is plotted at the value of the chosen threshold level. In general, stop signs obtain PCE values above the established threshold level. PCE values for false signs are below the threshold. However, it should be noted that a PCE value obtained for a non-training stop sign is below the threshold. This implies that a false alarm appears in the recognition process. Furthermore, some of the correlation peaks for other testing images do not coincide with the actual target position in the scene. This is observed in FIG. 6C where the position of the maximum correlation peak versus the actual position of the sign in the scene is plotted. The position is computed by using the distance of the center of the sign to the origin of the image (pixel (0,0) located on the left top corner). In this graph, the incorrect position of some correlation peaks is noticed. They correspond also to false alarms.

In this second method, tolerance to in-plane rotations is achieved by rotating the input scene and it is compared to nonlinear single filters of the bank. This bank of filters contains information of the reference varying in scale to allow a scale-invariant recognition system.

A digital algorithm for rotating the signal is used to obtain in-plane rotated versions of the scene to be analyzed. The input scene is rotated from −9 to 9 degrees in increments of 3 degrees. Rotated versions of the scene are then correlated with filters belonging to the bank. The output of the recognition system is related to the best match between the rotated versions of the input signal and the reference targets. Thus, the output coincides with the maximum PCE value.

Figure 7A:
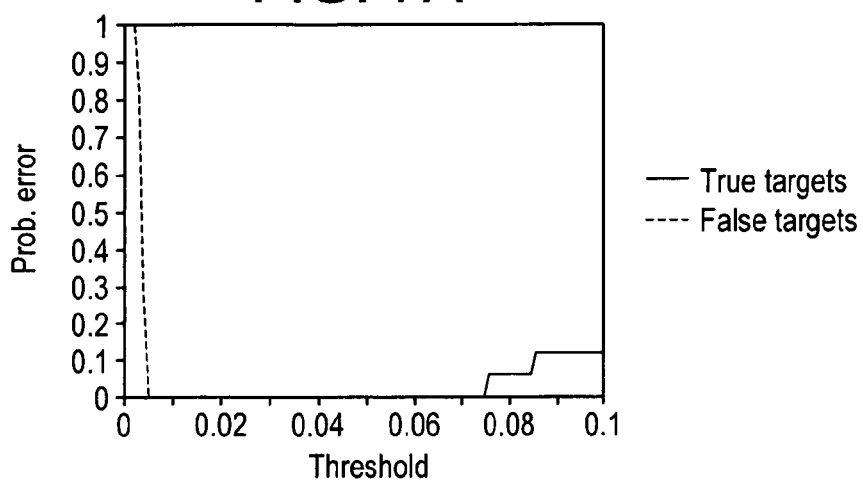
FIG. 7A is a graph of the set of recognition results for non-linear single filters and in-plane rotation wherein the probability of error in the classification of training images is shown.
Figure 7B:
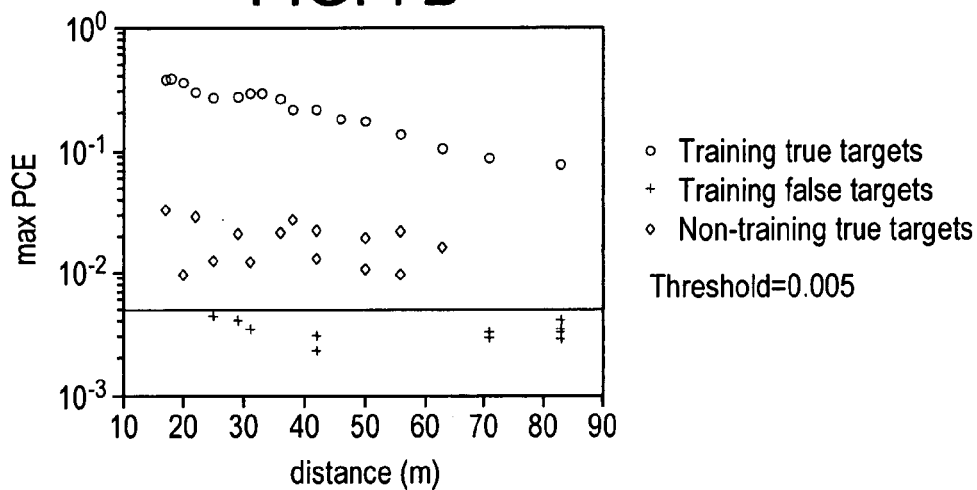
FIG. 7B is a graph of the set of recognition results for non-linear single filters and in-plane rotation wherein the classification of true targets and false targets with respect to the established threshold value is shown.
Figure 7C:
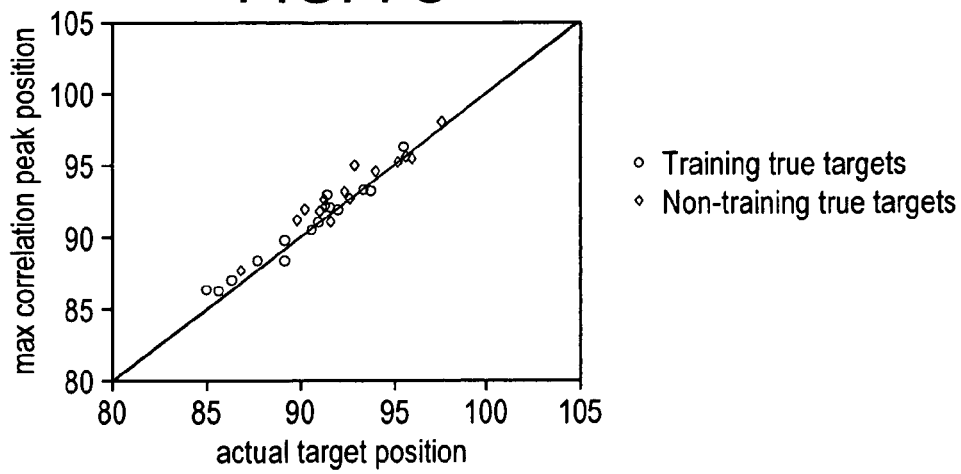
FIG. 7C is a graph of the set of recognition results for non-linear single filters and in-plane rotation wherein the correlation of peak position versus the actual target position in the scene is shown.

Improvement of recognition results can be seen in FIG. 7. FIG. 7A is a graph of the set of recognition results for non-linear single filters and in-plane rotation wherein the probability of error in the classification of training images is shown. In FIG. 7A, the interval with null probability of error increases, whereas in FIGS. 7B and 7C the successful recognition task is pointed out. That is, the training and non-training stop signs are correctly detected and located at the right position. They are also successfully distinguished from the other road signs used to test the discrimination capability of the system.

It can be concluded that if some tolerance to in-plane rotation is required in the recognition system, better results are achieved by using a single nonlinear filter and rotating the input image, rather than designing nonlinear composite filter for rotation invariance.

Due to the difficulty of generating digital out-of-plane rotated versions of the images, we implement them optically. Thus, stop signs are out-of-plane rotated from −9 to 9 degrees in increments of 3 degrees during the acquisition process. They are used as training images. These signs centered in a zero background, are used to construct nonlinear composite filters. A nonlinear composite filter (Eq. 8 with k=0.1) is obtained for each distance between the sign and the acquisition system to maintain scale-invariance.

A learning algorithm allows establishing the threshold value for the output of the recognition system. The value of the threshold is determined based on the results of FIG. 8A. FIG. 8A is a graph of the recognition results for non-linear ECP SDF filters tolerant to out-of-plane rotations wherein the probability of error in the classification of training images is shown.

Several non-training images slightly out-of-plane and rotated are captured and used to test the system's tolerance to this type of distortion. Pictures are taken with a view angle of 4 degrees. A wide range of distances between the road sign and the acquisition camera are also considered to keep scale-invariance.

Recognition results, once the established threshold level is applied, are shown in FIG. 8B. FIG. 8B is a graph of the recognition results for non-linear ECP SDF filters tolerant to out-of-plane rotations wherein the classification of true targets and false targets with respect to the established threshold value is shown.

Recognition of stop signs is always achieved by a PCE value larger than the threshold level. They are also discriminated from other signs. Correlation peaks corresponding to stop signs are located at the same position as the sign in the scenes (FIG. 8C). FIG. 8C is a graph of the recognition results for non-linear ECP SDF filters tolerant to out-of-plane rotations wherein the correlation peak position versus the actual target position in the scene is shown.

Results contained in FIGS. 8B and 8C show that the proposed recognition system is able to detect a partially out-of-plane rotated road sign at different distances from the acquisition system. This is due to the bank of composite filters that are being used. Information of out-of-plane rotation is included in nonlinear composite filters and allows detecting the sign even if it is slightly out-of-plane rotated or if it is captured with a different view angle by the acquisition system.

Improvement of recognition results for the distortion-tolerant system can be achieved by post-processing the obtained output results. That means, not only is an image (or a frame of a video sequence) taken into account for the final recognition result, but a set of images (or frames) captured at different distances. Following this scheme, it is feasible to reduce the number of false alarms due to objects or background other than the sought sign.

Recognition results comes by considering correlation outputs from four different images. Turning to FIG. 9, there is shown a graph of the recognition results achieved by post processing of the correlation outputs of FIG. 8B. During the learning process, null probability of error in the classification of training true targets and false signs is achieved in a wide range of threshold values.

The separate analysis of different distortions have shown the performance of the recognition system as a distortion-tolerant processor. The distortion-tolerant system is then applied to new captured images. They are selected as samples where it is difficult to recognize the road sign due to the amount of involved distortions. Selected images include stop signs modified by several distortions. They are captured under varying illumination due to shadows or different weather conditions, and in some cases the sign to be detected has been vandalized or appears partially occluded. In all the cases, stop signs are surrounded by a real cluttered background.

The designed recognition system is based on a nonlinear processor that uses a bank of composite nonlinear filters. The bank of filters serves to achieve scale-invariance in a wide range of distances from the sign to the acquisition system. Composite nonlinear filters, in particular k'th-law ECP SDF filters, provide tolerance to out-of-plane rotation of targets. Finally, rotation of the input signal allows tolerance to in-plane rotations. A certain degree of tolerance to illumination fluctuations is achieved as a consequence of using a nonlinear processor with parameter k close to zero (k=0.1).

Figure 10A:
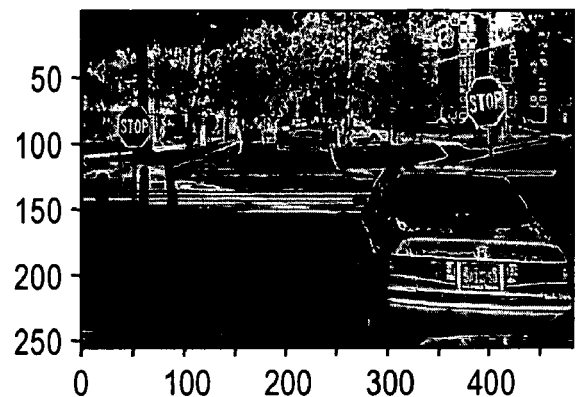
FIG. 10A is an image of the recognition results for a distorted-tolerant system wherein a particular input scene is shown.

FIG. 10A is an image of the recognition results for a distorted-tolerant system wherein a particular input scene is shown; it thus corresponds to an analyzed scene which includes two stop signs to be detected. These signs are located at both sides of the road, and they have different illumination. The stop sign on the left has a low average energy due to a shadow that completely covers it. This sign is partially in-plane and out-of-plane rotated. The stop sign on the right, however, has a non-uniform illumination due to shadows caused by the leaves and it has been vandalized. This sign is tilted, so that tolerance to in-plane rotation is needed to detect it correctly. It is also in-plane and out-of-plane rotated. We observe that the background of the picture is quite cluttered and there are areas with larger energy than the energy of stop signs.

Figure 10B:
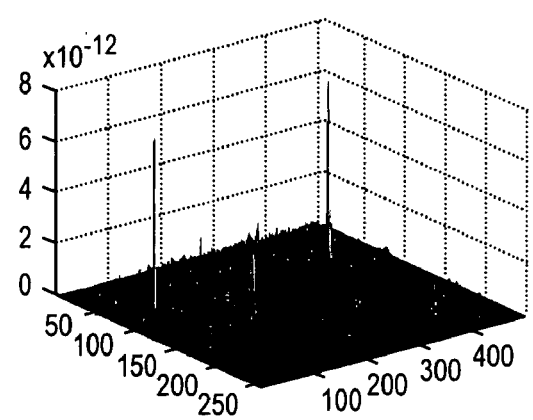
FIG. 10B is a 3D representation of the recognition results for a distorted-tolerant system having the input of FIG. 10A.
Figure 10C:
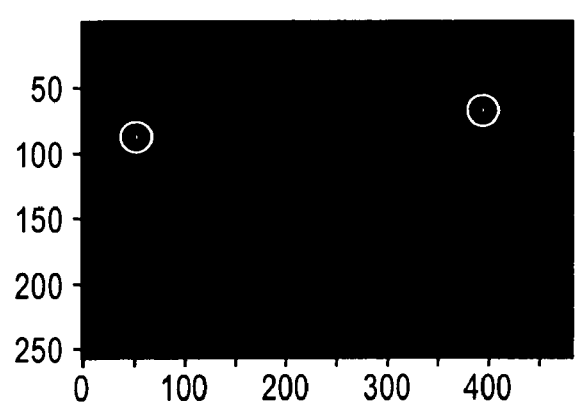
FIG. 10C is a 2D representation of the output plane for a distorted-tolerant system having the input of FIG. 10A.

FIG. 10B is a 3D representation of the recognition results for a distorted-tolerant system having the input of FIG. 10A. FIG. 10B shows the output correlation plane where two high intensity peaks appear and coincide with the position of the two true targets. Accuracy in the location of the peaks is easily observed in the 2D representation of the correlation plane (as shown in FIG. 10C). It should be noted that the recognition of both stop signs is achieved under different illumination conditions of the signs. This is mainly due to the nonlinearity applied in the nonlinear process.

Figure 11A:
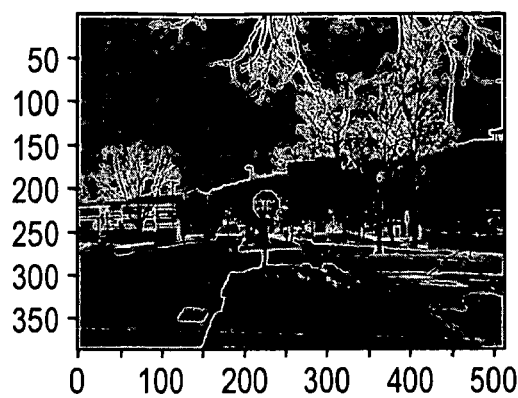
FIG. 11A is an image of the recognition results for a distorted-tolerant system wherein a particular input scene is shown.
Figure 11B:
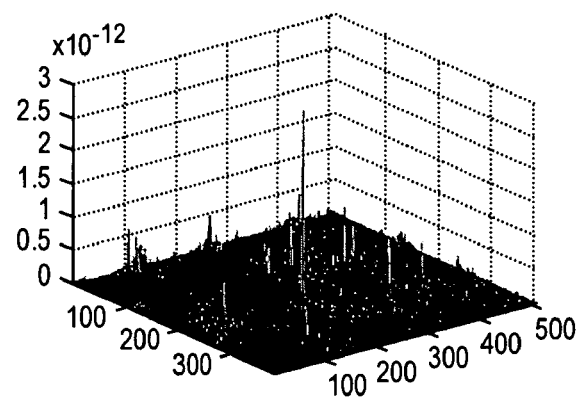
FIG. 11B is a 3D representation of the recognition results for a distorted-tolerant system having the input of FIG. 10A.
Figure 11C:
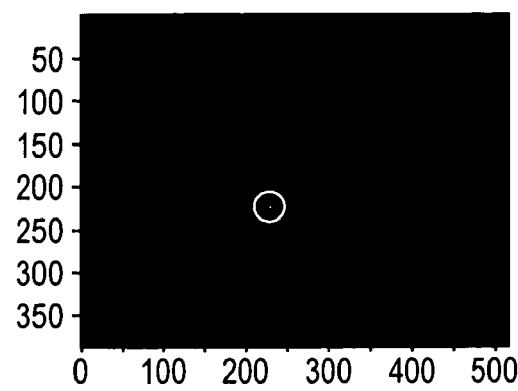
FIG. 11C is a 2D representation of the output plane for a distorted-tolerant system having the input of FIG. 11A.

A second sample consists of a stop sign strongly faded (FIG. 11A). FIG. 11A is an image of the recognition results for a distorted-tolerant system wherein a particular input scene is shown. The sign appears in a cluttered background and with an inverse contrast. However, a high and sharp correlation peak appears in the actual position of the road sign (FIGS. 11B and 11C). This implies a satisfactory recognition of the sought sign. FIG. 11B is a 3D representation of the recognition results for a distorted-tolerant system having the input of FIG. 10A. and FIG. 11C is a 2D representation of the output plane for a distorted-tolerant system having the input of FIG. 11A.

Figure 12A:
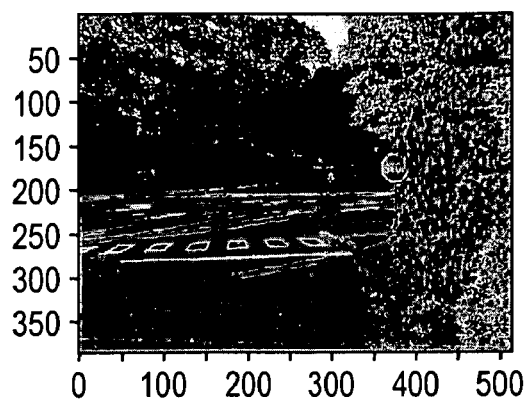
FIG. 12A is an image of the recognition results for a distorted-tolerant system wherein a particular input scene is shown.
Figure 12B:
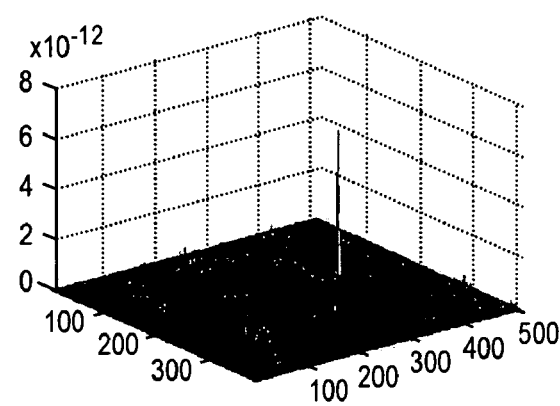
FIG. 12B is a 3D representation of the recognition results for a distorted-tolerant system having the input of FIG. 10A.
Figure 12C:
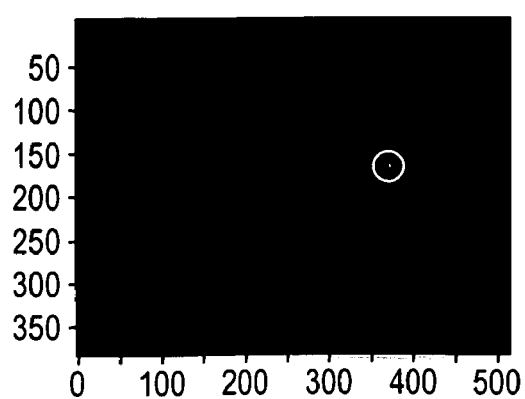
FIG. 12C is a 2D representation of the output plane for a distorted-tolerant system having the input of FIG. 12A.

FIG. 12A is an image of the recognition results for a distorted-tolerant system wherein a particular input scene is shown. The stop sign that is contained in the scene appears partially occluded by a tree. Detection and location of this sign is also satisfactory as it can be seen from the 3D output graph of FIG. 12B or as a 2D representation in FIG. 12C. A high and sharp peak is obtained in a low output-noise floor. FIG. 12B is a 3D representation of the recognition results for a distorted-tolerant system having the input of FIG. 10A and FIG. 12C is a 2D representation of the output plane for a distorted-tolerant system having the input of FIG. 12A.

From the results, it can be concluded by those skilled in the art that the proposed recognition system is able to detect and locate road sign in real background images. The detection is successfully achieved even when the road sign is varying in scale, slightly rotated, illuminated under different conditions, faded or partially occluded.

A road sign recognition system has been proposed based on nonlinear processors. Analysis of different filtering methods allows us to select the best techniques to overcome a variety of distortions. The most frequent distortions when dealing with road sign detection are scale variations, in-plane and out-of-plane rotation and illumination variations of the targets.

The entire processor performs several correlations between different input scenes and a set of reference targets. Multiple correlation results are then processed to give a single recognition output. A learning process is carried out to establish a threshold value, which determines whether or not any object contained in an input scene is similar to the target.

Scale-invariance is provided to the recognition system by means of a bank of nonlinear filters. Filter bank recognition system shows a better performance than nonlinear composite filters. Images of a true target captured from different distances constitute the set of filters in the bank. A non-uniform increment of variation in scale is established to properly recognize signs located a far distances from the acquisition system. Apart from locating a true sign, this method allows the system user to approximately determine the distance between the acquisition system and the road sign.

In-plane rotation invariance is achieved by rotating the input scene. Recognition results obtained by this method are compared to results obtained for nonlinear composite filters. Composite filters are constructed by using digital rotated versions of the reference target. In-plane rotation of the input scene allows better detection results than composite filters. Moreover, in the design of composite filters the maximum number of images included in a composite filter is limited, whereas range of the input scene rotation can be determined based on the application.

Tolerance requirements for out-of-plane rotation of the targets can be satisfied by using nonlinear composite filters rather than using individual filters in the filter bank. In particular, k'th-law equal-correlation-peak synthetic-discriminant-function (ECP SDF) filters are used.

The entire recognition system has been tested in real static images as well as in a video sequence. Scenes were captured in real environments, with cluttered backgrounds and contained many distortions simultaneously. Recognition results for various images show that, the proposed recognition system is able to properly detect a given road sign even if it is varying in scale, slightly tilted or viewed under different angles. In addition, the system is robust to changes in illumination due to shadows or weather conditions. It is also able to locate a faded or vandalized sign along with partially occluded road signs. Obviously, the processor can be designed for different varieties of road signs in noisy background scenes. Additionally, the post-processing of correlation output allows to significantly improve recognition of distorted road signs.

As can be appreciated by those skilled in the art, a number of variations or embodiments of the subject invention are possible. These variations include, but are not limited to: the method and means for mounting the processor upon a vehicle or platform; the method and means for storing image data; and, the method and means for reacting to a successful match of the scanned image with a stored image.

What is claimed is:

1. A method of processing an image wherein said image is viewed from a host, comprising:
   (a) initiating a scan of an object within a field so as to obtain an input,
   (b) converting said input to a signal representative of said input;
   (c) comparing said input with each one of a set of stored inputs to determine a match; and
      (i) if a match is determined, then causing an action to be performed in accordance with a set of instructions associated with said stored input; and
      (ii) if a match is not determined then continuing to scan said field for a second or subsequent image to be subjected to said comparing; and
   wherein said converting further comprises:
   (a) converting said input via a fourier transform of said input to produce a transformed input; and
   (b) filtering said transformed input using nonlinear filtering.

2. The method of claim 1, wherein each one of said stored inputs are produced according to a method comprising:
   (a) converting a predetermined input via a fourier transform of said predetermined input to produce a stored input; and
   (b) filtering said stored input using nonlinear filtering.

3. The method of claim 1, wherein said object is a particular road sign.

4. The method of claim 1, wherein said object is a particular animal.

5. The method of claim 1, wherein said stored input is indicative of one or more road signs.

6. The method of claim 1, wherein said stored input is indicative of one or more animals.

7. The method of claim 1, wherein at least one of said set of instructions comprises a stop instruction for stopping movement of said host.

8. The method of claim 1 wherein said filtering of said transformed input using nonlinear filtering further comprises sending said transformed input through at least one composite nonlinear filter.

9. The method of claim 1 wherein said filtering of said transformed input using nonlinear filtering further comprises sending said transformed input through a filter bank comprised of a plurality of composite nonlinear filters.

10. A method of automatically identifying a road sign from a moving vehicle, said method comprising:
    (a) initiating a scan of a road sign so as to obtain an identifying input wherein said identifying input is capable of being converted to a signal representative of said road sign;
    (b) comparing said identifying input with each one of a set of stored road sign inputs to determine a match; and
       (i) if a match is determined, then causing an action to be performed in accordance with a set of instructions associated with said stored input; and
       (ii) if a match is not determined then continuing to scan for a second or subsequent road sign to be subjected to said comparison step wherein said converting further comprises:
    (a) converting said input via a fourier transform of said input to produce a transformed input; and
    (b) filtering said transformed input using nonlinear filtering.

11. The method of claim 10, wherein said object is a particular road sign.

12. The method of claim 10, wherein said object is a particular animal.

13. The method of claim 10, wherein said stored input is indicative of one or more road signs.

14. The method of claim 10, wherein said stood input is indicative of one or more animals.

15. The method of claim 10, wherein at least one of said set of instructions comprises a stop instruction for stopping movement of said host.

16. The method of claim 10 wherein said filtering of said transformed input using nonlinear filtering further comprises sending said transformed input through at least one composite nonlinear filter.

17. The method of claim 10 wherein said filtering of said transformed input using nonlinear filtering further comprises sending said transformed input through a filter bank comprised of a plurality of composite nonlinear filters.

18. A system mounted on a host for processing an image comprising:
   (a) means for scanning an image;
   (b) conversion means for converting said scanned image to a set of data for comparison with one or more stored sets of data wherein said one or more stored sets of data are representative of one or more expected images
   wherein said conversion means further comprises:
      means for converting said scanned image via a fourier transform of said scanned image to produce a transformed input; and
      means for filtering said transformed input using nonlinear filtering;
   (c) a set of instructions associated with each one of stored sets of data wherein said set of instructions is indicative of an action to be performed by said host if a match is determined between said set of data and a one of said stored sets of data;
   (d) comparison means for comparing said set of data to each one of said stored sets of one or more images;
   (e) determination means for determining whether or not said set of data matches one of said stored sets of data; and
   (f) transmission means for transmitting a signal from said system to said host to react in accordance with said set of instructions.

19. The system of claim 18, wherein said host is a vehicle and wherein said system is mounted on said vehicle so as to be in a position to scan for road signs.

20. The system of claim 18, wherein said set of instructions comprises an instruction for said vehicle to stop in recognition of a stop sign.

21. The system of claim 18, wherein said system further comprises:
   (a) a first memory for storing said stored sets of data; and
   (b) a second memory for storing said set of instructions.

22. The system of claim 18 wherein said means for filtering said transformed input using nonlinear filtering comprises means for sending said transformed input through at least one composite nonlinear filter.

23. The system of claim 18 wherein said means for filtering said transformed input using nonlinear filtering comprises means for sending said transformed input through a filter bank comprised of a plurality of composite nonlinear filters.

* * * * *